United States Patent
Brant, Jr. et al.

(10) Patent No.: US 7,055,225 B1
(45) Date of Patent: Jun. 6, 2006

(54) HOSE CLAMP

(76) Inventors: John L. Brant, Jr., 4919 Owl Haven St., San Antonio, TX (US) 78250; Arturo M. Hernandez, 154 Osage Dr., San Antonio, TX (US) 78207

( * ) Notice: Subject to any disclaimer, the term of this patent is extended or adjusted under 35 U.S.C. 154(b) by 43 days.

(21) Appl. No.: 10/887,043

(22) Filed: Jul. 7, 2004

Related U.S. Application Data

(60) Provisional application No. 60/485,651, filed on Jul. 9, 2003.

(51) Int. Cl.
 *F16L 25/00* (2006.01)
(52) U.S. Cl. .................................. 24/269; 285/420
(58) Field of Classification Search ............... 285/420, 285/410; 24/19, 269
 See application file for complete search history.

(56) References Cited

U.S. PATENT DOCUMENTS

| | | | | |
|---|---|---|---|---|
| 2,522,494 A | * | 9/1950 | Baldo ...................... | 24/274 R |
| 4,546,524 A | * | 10/1985 | Kreft .......................... | 24/269 |
| 5,257,439 A | * | 11/1993 | LeBlanc ..................... | 24/269 |
| 5,327,618 A | * | 7/1994 | Chene et al. .............. | 24/274 R |
| 5,661,876 A | * | 9/1997 | Goldenberg ................ | 24/19 |
| 5,729,873 A | * | 3/1998 | Miley ....................... | 24/274 R |

\* cited by examiner

*Primary Examiner*—David Bochna
(74) *Attorney, Agent, or Firm*—Kenneth L Tolar

(57) ABSTRACT

A hose clamp having an elongated band having first and second opposed ends which are overlapped to form an annular clamp member. A plurality of indentions are longitudinally positioned on the band. An adjustment assembly is fastened to the clamp member and includes a housing having a drive gear received therein. The drive gear includes peripheral teeth that engage the indentions whereby rotation of the gear results in the first and second ends moving to vary the circumference of the clamp member. The drive gear is driven with an adjustment screw that is positioned perpendicular to the clamp member circumference for easier access.

1 Claim, 1 Drawing Sheet

HOSE CLAMP

CROSS REFERENCE TO RELATED APPLICATIONS

This application is entitled to the benefit of Provisional Application No. 60/485,651 filed on Jul. 9, 2003.

1. Technical Field of the Invention

The present invention relates to an improved hose clamp having an adjustment screw perpendicular to the circumference thereof for more easily adjusting the clamp within confined spaces.

2. Description of the Prior Art

Adjustable hose clamps are used to secure hoses to various fittings. The hose clamp includes an encircling band having a circumference that is adjusted with a worm gear or screw; the screw is mounted tangentially relative to the band and perpendicular to the hose which renders it inaccessible when the clamp is positioned between spaced objects. Accordingly, there is currently a need for a hose clamp having an adjustment screw that is more easily accessible than those on conventional hose clamps. The present invention addresses this problem by providing a uniquely designed hose clamp having an adjustment screw that is perpendicular to the circumference thereof for easy access.

SUMMARY OF THE INVENTION

The present invention relates to a hose clamp including an elongated band having first and second ends. The first and second ends are overlapped to form an annular clamp member. Longitudinally disposed on the band are a plurality of indentions. Mounted on the band and positioned over the overlapping ends is an adjustment mechanism for increasing and decreasing the circumference of the clamp member. The adjustment mechanism includes a housing having a drive gear received therein. The drive gear includes a plurality of peripherally disposed gear teeth that selectively seat within the indentions to move one end of the band relative to the other to vary the circumference of the clamp member. A screw is fixedly attached to the drive gear and protrudes from a side of the housing. The screw is positioned perpendicular to the clamp member circumference and the opening formed thereby; fastened to an opposing end of the drive gear is a sprocket that is normally engaged by a spring-biased pawl; the pawl prevents rotation of the screw and drive gear in a counterclockwise direction. The pawl is accessible via an aperture formed on the adjustment mechanism housing.

It is therefore an object of the present invention to provide a hose clamp having an adjustment assembly that is more accessible than those of conventional hose clamps.

It is another object of the present invention to provide a hose clamp that can be more easily manipulated within confined spaces.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
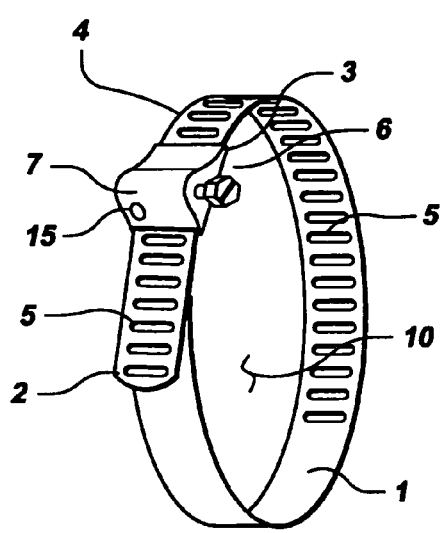
FIG. 1 is a perspective view of the hose clamp according to the present invention.
Figure 2:
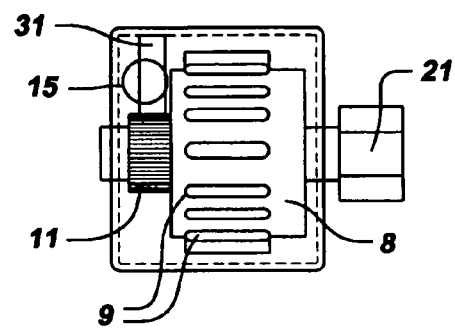
FIG. 2 is a side, cross sectional view of the adjustment mechanism housing.
Figure 3:
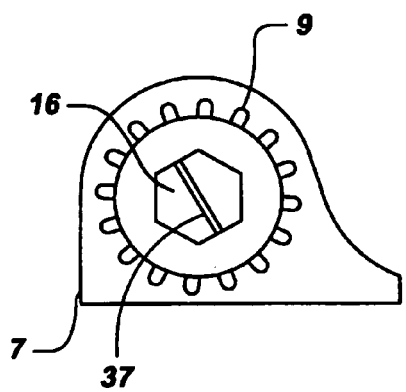
FIG. 3 is a front view of the adjustment mechanism housing.
Figure 4:
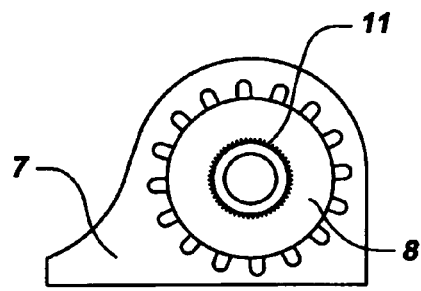
FIG. 4 is a rear view of the adjustment mechanism housing and internal drive gear.
Figure 5:
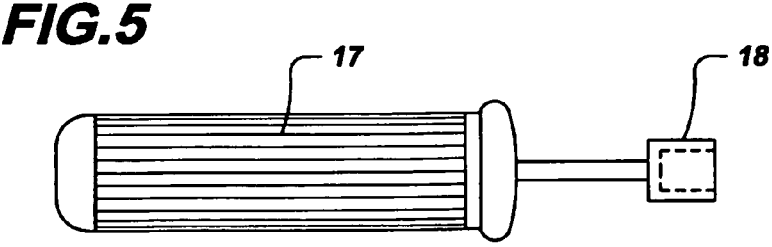
FIG. 5 depicts the accompanying tool for driving the adjustment screw.

The present invention relates to a hose clamp including an elongated band 1 having first 2 and second ends 3. The first and second ends are overlapped to form an annular clamp member 4 that defines a hose receiving opening 10. Longitudally disposed on the band are a plurality of indentions 5.

Mounted on the band and positioned over the overlapping ends is an adjustment mechanism 6 that increases and decreases the circumference of the clamp member. The adjustment mechanism includes a housing 7 having a drive gear 8 received therein. The drive gear includes a plurality of peripherally disposed gear teeth 9 that selectively seat within the indentions to move one end of the band relative to the other to vary the circumference of the clamp member.

A screw 21 is fixedly attached to the drive gear and protrudes from a side of the housing. The screw has an axis of rotation that is perpendicular to the clamp member circumference and the opening 10 formed thereby; accordingly, when the clamp member is positioned about the hose, the screw will be parallel thereto to allow a user to easily access it regardless of any adjacent objects that would otherwise obstruct such access.

Attached to an opposing end of the drive gear is a sprocket 11 that is normally engaged by a spring-biased pawl 31 for preventing rotation of the screw and drive gear in a counterclockwise direction. Accordingly, as the clamp member is being tightened, the resulting tension applied to the gear will not loosen the clamp. The pawl is accessible via an aperture 15 formed on the adjustment mechanism housing allowing it to be lifted out of engagement with the sprocket when loosening or removing the clamp.

The adjustment screw includes a head 16 with a slot 37 formed thereon for reception of a driving implement such as a screw driver. The head may be hexagonal and can therefore be driven with an accompanying tool 17 having a hexagonal socket 18 thereon for driving the screw head. The screw can be produced in English or metric sizes.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A hose clamp comprising:
    an elongated band having a first end and a second opposing end, said first and seconds end overlapped to form a substantially circular clamp member that defines a hose receiving opening;
    an adjustment means mounted on said band for varying a circumference of said clamp member, said adjustment means including an adjustment screw having an axis of rotation positioned perpendicular to a plane defined by said hose receiving opening so as to be accessible when said clamp member is within a confined location, wherein said adjustment means further includes a plurality of indentions longitudinally positioned on said band, a drive gear fixedly attached to said adjustment screw, said gear having a plurality of teeth peripherally positioned thereon, said teeth engaging the indentions formed on said band whereby rotation of said gear results in the first end of said band moving relative to the second end thereof to vary the circumference of said clamp member;

a sprocket fixedly attached to said drive gear;

a spring-biased pawl engaging said sprocket to prevent rotation of said drive gear in a predetermined direction;

a housing encasing said drive gear, said sprocket and said pawl, said housing including an aperture positioned thereon for receiving an implement to allow access to said pawl to move said pawl out of engagement with said sprocket allowing said sprocket to rotate in said predetermined direction.

\* \* \* \* \*